US008414822B2

(12) United States Patent
Galloway et al.

(10) Patent No.: US 8,414,822 B2
(45) Date of Patent: Apr. 9, 2013

(54) PROCESSES FOR CHEMICALLY AFFECTING REACTIVE MATERIALS WITH X-RAYS

(75) Inventors: Richard A. Galloway, East Islip, NY (US); Anthony J. Berejka, Huntington, NY (US); Olivier Gregoire, Meeffe (BE); Marshall Robert Cleland, Hauppauge, NY (US)

(73) Assignee: Ion Beam Applications, S.A., Louvain-la-Neuve (BE)

( * ) Notice: Subject to any disclaimer, the term of this patent is extended or adjusted under 35 U.S.C. 154(b) by 758 days.

(21) Appl. No.: 11/233,910

(22) Filed: Sep. 23, 2005

(65) Prior Publication Data

US 2008/0196829 A1  Aug. 21, 2008

Related U.S. Application Data

(60) Provisional application No. 60/612,642, filed on Sep. 24, 2004.

(51) Int. Cl.
*B29C 35/08* (2006.01)
(52) U.S. Cl. ........................................ 264/488
(58) Field of Classification Search .............. 264/488
See application file for complete search history.

(56) References Cited

U.S. PATENT DOCUMENTS

| 4,650,845 A * | 3/1987 | Hegel ................... 526/261 |
| 4,689,488 A | 8/1987 | Beziers |
| 4,789,505 A | 12/1988 | Beziers |
| 5,538,514 A * | 7/1996 | Hawkins ................ 424/423 |
| 5,951,808 A | 9/1999 | Lacour et al. |
| 2006/0216538 A1 | 9/2006 | Berejka et al. |

OTHER PUBLICATIONS

Frederick C. Mish et al., Merriam-Webster's Collegiate Dictionary, 1999, Merriam-Webster, Incorporated, 10th Edition, p. 749.*
Cleland, M.R., X-Ray Processing: A Review of the Status and Prospects, Radiat. Phys. Chem 42(1-3), 499-503, 1993.
Meissner et al., X-Ray Treatment At 5MeV and Above, Radiat. Phys. Chem 57, 647-651, 2000.
D. Beziers et al., Composites Structures Obtained by Ionization Curing, Radiat. Phys. Chem. 48(2), 171-177, 1996.
Brenner, W. and Oliver, W, Commercial Aspects of Instantaneous Radiation Cure of Reinforced Plastics, The Society of the Plastic's Industry, Inc., 22nd Annual Conference,(1967) §-E , pp. 1-5.

(Continued)

*Primary Examiner* — Christina Johnson
*Assistant Examiner* — Patrick Butler
(74) *Attorney, Agent, or Firm* — McNeely Hare & War; Christopher Casieri

(57) ABSTRACT

The present invention describes a method for curing polymers and polymer composites with X-rays generated by the bremsstrahlung effect, using a high power, high energy electron beam. The process generates X-rays with sufficient throughput and penetration for commercial use. The present invention employs high power, high energy electron beams to create the X-rays. The beams are typically run at energies ranging from 1 MeV to 10 MeV, preferably from 3 MeV to 10 MeV, and more preferably from 5 MeV to 7 MeV. The beams typically have powers ranging from 30 kW or higher, preferably 80 kW or higher, more preferably 100 kW of higher, and ideally at least 200 kW. Suitable polymers and polymer composites include, but are not limited to, polymeric molding materials, fiber reinforced molding materials, reactive monomer impregnated wood, similar and dissimilar materials bonded through adhesives.

19 Claims, 3 Drawing Sheets

OTHER PUBLICATIONS

A. Singh et al., Electron Processing of Fiber-Reinforced Advanced Composites, Radiat. Phys. Chem 48(2) 153-170 (1996).
A.J. Berejka et al., Electron Beam Curing of Composites in North America, Radiat. Phys. Chem. 63, 551-556 (2002).
A.E. Witt, Applications in Wood Plastics, Radiat. Phys. Chem., vol. 9, Nos. 1-3, 271-288 (1977).
C.B. Saunders et al., Electron Curing of Fibre-Reinforced Composites: An Industrial Application for High-Energy Accelerators, Radiation Physics and Cheinistry, vol. 46, No. 4-6, pp. 991-994, 1995.
Kerluke, D.R et al., X-Ray Processing of Advanced Composites at 5 MeV and above, SAMPE Technical Conference, Long Beach, CA.

* cited by examiner

PROCESSES FOR CHEMICALLY AFFECTING REACTIVE MATERIALS WITH X-RAYS

CROSS REFERENCE TO RELATED APPLICATION

This application claims the benefit of U.S. Provisional Patent Application No. 60/612,642, filed Sep. 24, 2004, the entirety of which is hereby incorporated by reference into this application.

BACKGROUND OF THE INVENTION

1. Field of the Invention

The invention pertains to a method of X-ray curing monomeric, oligomeric, or polymeric materials, such as molding materials, polymer composites, impregnated wood and adhesives.

2. Description of Related Art

Polymeric materials, including polymer composites, are used for a wide range of applications because of their excellent mechanical and structural properties and high strength-to-weight ratios. One way to initiate the curing process for polymers is to use an energy input.

When curing composites, the requisite energy is most often thermal, and is provided by an autoclave, oven, heated press, heated column or the like. However, thermal curing has several drawbacks, including long cure cycles, high energy consumption, stress induction due to temperature differentials within the object, expensive tooling, and often the emission of volatile organic compounds and greenhouse gases. Heat transfer efficiency drops as the thickness of the article increases, which imposes limitations on the thickness of the article and/or the processing time. Finally, for complex shapes, the molds employed must be carefully engineered to insure balanced thermal input.

In contrast to thermal energy, ionizing radiation causes very little heating of the material. X-ray curing is fast, energy efficient, environmentally friendly, safe and controllable. Accordingly, research on electron beam curing of reinforced plastics dates back to the late 1960's. W. Brenner, W. F. Oliver, *Commercial aspects of instantaneous radiation cure of reinforced plastics*. Society of Plastics Industry 22$^{nd}$ Annual Conference, Reinforced Plastics Division (1967). Similar work was carried on in the 1990's. A. Singh et al., *Electron processing of fiber-reinforced advanced composites*. Radiat. Phys. Chem. 48 (2), 153-170 (1996) and A. J. Berejka et al., *Electron beam curing of composites in North America*. Radiat. Phys. Chem. 63, 551-556 (2002). Illustrative methods are set forth in D. Lacour, et al, *Method for Producing High Dimensional Precision Composite Elements Using Ionization Polymerization and Elements Produced by Said Method*, U.S. Pat. No. 5,951,808, which describes methods to cure thin composite panels with high-energy electrons.

However, electron beams are severely limited in their penetration capabilities. For example, a 10 MeV electron beam, which is the highest practical energy due to the risk of generating radioactivity in certain materials, only penetrates about 2.5 cm of a typical composite when treated from one side. This puts limitations on the thickness and shape of parts that can be cured using electron beam energy and prevents the curing of such parts in molds. In addition, monomeric or oligomeric starting materials used as matrix binders, the high dose rates of electron beam processing can lead to an excess concentration of ionized species, thus creating disproportionation and termination reactions that compete with the desired polymerization and curing.

Wood has been impregnated with curable polymer forming reactants to impart surface hardness, dimensional stability and resistance to weathering. In such cases, thermal curing is undesirable due to the adverse effects heat has on wood and to the possible volatility of the reactants. Once again, electron beam curing is an alternative. However, such curing is limited to relatively thin products, such as flooring, due to the penetration limitations of electron beam processing. A. E. Witt *Applications in Wood Plastics* Radiat. Phys. Chem., vol. 9, nos. 1-3, 271-288 (1977).

Adhesives, such as epoxies, are commonly used to join similar or dissimilar materials. The adhesives can be cured thermally, but thermal curing imparts strain at the adhesive bond surfaces due to differences in the thermal expansion and contraction, and the thermal conductivity of the diverse materials. Once again, while electron beam processing has proven effective in thin film laminates, more complex shapes pose difficulty both in terms of beam penetration and orientation of the shaped article to the ionizing radiation source.

Gamma rays have been investigated as an alternative source of curing energy. However, gamma rays are emitted from a radioactive source at all times in all directions. Such emissions cannot be turned on or off, nor focused in a particular direction. Therefore, gamma ray exposure can be complicated and requires expensive and heavily regulated operating procedures.

Ultraviolet radiation (UV) has been investigated as an alternative source of curing energy. However, UV, while relying upon inexpensive sources, has even less penetrating power than electron beam. Ultraviolet radiation only provides line of sight surface curing.

The physical properties of high-energy X-rays are well known. This high-frequency electromagnetic radiation is produced when high-energy electrons strike any material. The X-ray yield increases with the electron energy and the atomic number of the target. The penetration in irradiated materials also increases with the electron energy. M. R. Cleland, *X-ray Processing: A Review of the Status and Prospects*, Radiat. Phys. Chem. 42(1-3), 499-503 (1993). The practical efficiency for converting incident electron beam power into emitted X-ray power is limited by basic physical considerations to about 8% with 5 MeV electrons and about 16% with 10 MeV electrons. J. Meissner et al., *X-ray treatment at 5 MeV and above*. Radiat. Phys. Chem. 57, 647-651 (2000). Such low power conversion efficiencies have heretofore implied low X-ray processing rates when compared to the radiation treatment of products that are thin enough to be treated with high-energy electron beams. Even with such low dose rates, there are some applications for X-ray processing where the greater penetration of high-energy X-rays have been found to be beneficial.

The European organization Aerospatiale, located in Saint Medard en Jallels, France, developed a process to cure carbon fiber composite cases for rocket motors with a combination of high-energy electrons and X-rays. Electrons were used on the thinner cross-sections and X-rays for thicker areas. These large structures were made by wet filament winding with carbon fibers coated with acrylated materials, which were then cured by irradiation in air. D. Beziers et al., *Composites structures obtained by ionization curing*, Radiat. Phys. Chem. 48 (2), 171-177 (1996). Daniel Beziers, *Apparatus for the Polymerization and/or Crosslinking of a Resin Used in the Composition of a Composite Material Part by Means of Ionizing Radiation*, U.S. Pat. No. 4,689,488, Aug. 25, 1987.

Daniel Beziers, Process for the Polymerization and/or Crosslinking of a Resin Used in the Composition of a Composite Material Part by Means of Ionizing Radiation, U.S. Pat. No. 4,789,505, Dec. 6, 1988. The basic concepts of curing composites with X-rays has been reviewed briefly in another paper. D. R. Kerluke, et al., *X-Ray Processing of Advanced Composites at 5 MeV and Above*, in Proceedings of the SAMPE 2002 Conference, which was held in Long Beach, Calif., USA on May 12-16, 2002. SAMPE is an acronym for Society for the Advancement of Material and Process Engineering, Covina, Calif. 91722 USA.

Several firms have produced high-energy, high-power electron accelerators which have been used for various applications of X-ray processing. Nissin High Voltage, located in Kyoto, Japan, has made Cockcroft-Walton direct-current accelerators rated for 150 kW of electron beam power at 5 MeV. Radiation Dynamics, Inc. (RDI), a subsidiary of Ion Beam Applications, located in Edgewood, N.Y., USA makes Dynamitron® direct-current accelerators rated for 300 kW of electron beam power at 5 MeV. Ion Beam Applications (IBA), located in Louvain-la-Neuve, Belgium, makes Rhodotron® radio-frequency accelerators rated for 135 kW of electron beam power at 5 MeV and 200 kW at 7 to 10 MeV. IBA has recently developed and tested a more powerful Rhodotron rated for 500 kW of electron beam power at 5 MeV and 700 kW at 7 MeV. These very high power systems compensate for product through-put limitations which may occur with X-ray processing as a consequence of the power conversion inefficiencies for producing X-rays from electron beams. The basic concepts of Rhodotron® accelerators are described in Annick N'Guyen and Jacques Pottier, *Electron Accelerator with Coaxial Cavity*, U.S. Pat. No. 5,107,221, the entirety of which is incorporated herein by reference.

BRIEF SUMMARY OF THE INVENTION

The present invention provides a process of curing polymer composites with X-rays, generated by the bremsstrahlung effect, using a high power, high energy electron beam. The process generates X-rays with sufficient throughput capability and penetration for commercial use.

The present invention employs high power, high energy electron beams to create the X-rays. The beams are typically run at energies ranging from 1 MeV to 10 MeV, preferably from 3 MeV to 10 MeV, and more preferably from 5 MeV to 7 MeV. The beams typically have powers ranging from 30 kW or higher, preferably 80 kW or higher, more preferably 100 kW or higher, and ideally at least 200 kW.

Suitable polymer composites include, but are not limited to, fiber reinforced materials, natural, renewable resources as wood which has been impregnated with suitable reactive materials, and similar, or dissimilar materials bonded with radiation responsive adhesives. As demonstrated herein, each of these polymer composites can be quickly and effectively cured with X-rays generated from high power, high energy electron beams. This invention is not limited to these envisionments. Those skilled in the art will recognize that many opportunities and product applications are made possible by the X-ray process described herein.

Accordingly, one aspect of the invention is a method for curing a fiber reinforced polymer composite using X-rays obtained by converting a high energy, high power electron beam. This method comprises the step of transporting the composite, one or more times, through X-ray photons generated from a high energy, high power electron beam resulting from the bremsstrahlung effect. The polymer composite may be a molding material in a mold, or a wood impregnated with curable material, or one or more adhesive bonded materials. Another aspect of the invention is a facility that performs the method described above. The facility comprises the polymer composite, a means of conveyance for transporting objects before the X-ray source, a target and one or more high-energy, high-power accelerators.

In contrast to thermal processes, X-ray radiation is fast, energy efficient, and environmentally friendly, generating little or no volatile organic compounds and greenhouse gases. Because X-rays initiate a chemical response directly in the matrix binder, as opposed to transferring thermal energy through a heated mold, thinner, less complicated, and less expensive molds can be utilized. Because the molds need not be heated, they can be made from a variety of materials such as aluminum or, even inexpensive and easy to form plastic materials. The ability to cure thick materials without large temperature increases also allows for more stability in the shape and physical dimensions of the finished product. Thermally induced deformation and stresses are practically eliminated.

In contrast to electron beam and UV radiation, X-rays penetrate thick materials, including molds, thereby permitting the cure of thicker materials, materials in molds, and materials where line of sight curing is impractical due to curves and folds in the object. X-rays exhibit about 5 to 10 times the penetration of electron beams. Because molds can be utilized, the uncured molding materials need not be in the form of free-standing, self-supporting fiber-matrix prepregs. This permits improved fiber wetting, fiber-matrix adhesion, and surface finish. The very controllable dose rate of X-ray processing permits controlled curing, reducing the termination reactions that compete with the curing processes. This is efficacious in curing matrix materials, adhesives, coatings and the in-situ polymerization of monomeric constituents. Higher power electron beams that can be used as a source for X-ray conversion permit X-ray processing to match the through-put capabilities of many electron beam systems, but without concerns over the thickness, shape or, orientation of materials to the photon or, X-ray beam.

In contrast to gamma radiation, X-rays are derived from a controllable electrical energy source. The beam is directed and can be turned on and off almost instantaneously. Therefore, the use of X-rays is easier, safer and less expensive than gamma radiation.

These and other features of the present invention are set forth herein.

BRIEF DESCRIPTION OF THE SEVERAL VIEWS OF THE DRAWINGS

The skilled artisan will understand that the drawings, described below, are for illustration purposes only. The drawings are not intended to limit the scope of the present teachings in any way.

DETAILED DESCRIPTION OF THE INVENTION

Definitions

Figure 1:
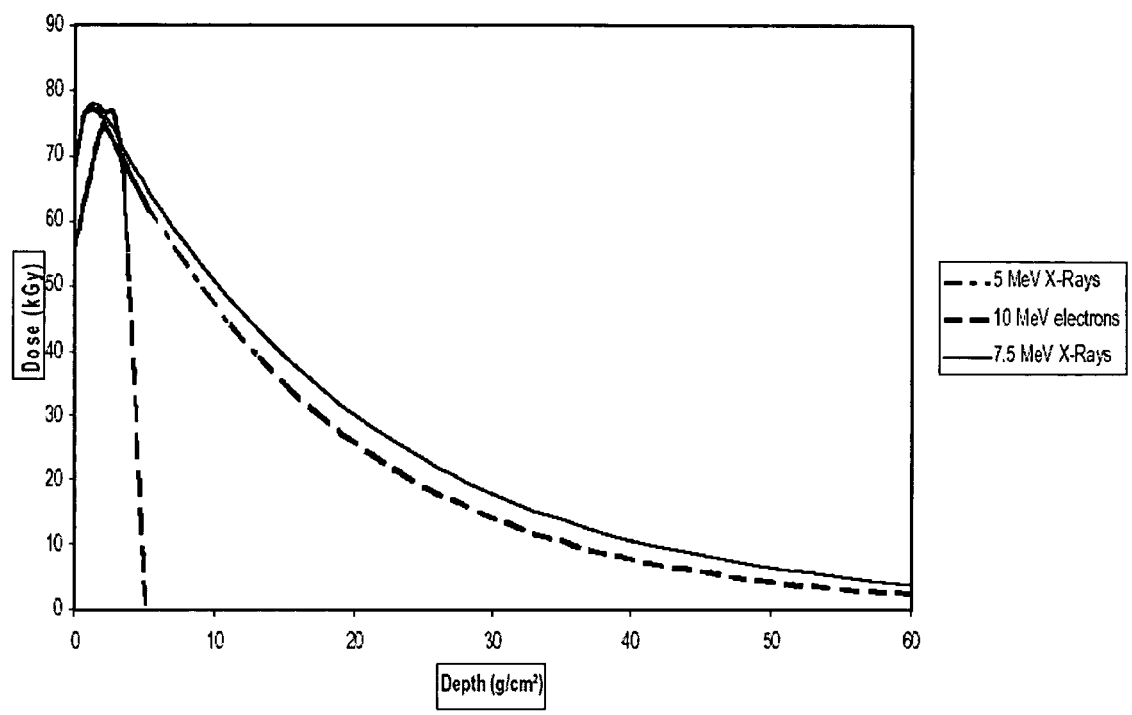
FIG. 1 provides a graphic comparison of the penetration power of X-ray and electron beam radiation.

Unless defined otherwise, all technical and scientific terms used herein have the meaning commonly understood by those of ordinary skill in the art. The following words and phrases have the following meanings:

"Polymer composite" is any object that contains one or more polymers, or polymer forming reactants, preferably in combination with one or more additional materials. Suitable additional materials include, but are not limited to, fiber reinforcements, fillers, other thermoplastic and thermosetting polymers, metals, ceramics, glass and natural, renewable sources, such as wood.

"Cure" means to react materials to impart cross-linking, thereby forming an insoluble, three dimensional polymer network.

"High power" means 30 kW or more, preferably 80 kW or more, more preferably 100 kW or more, and ideally 200 kW or more.

"High energy" means at least 1 MeV, preferably 1 to 10 MeV, more preferably 3 to 10 MeV and ideally 5 to 7 MeV.

High Energy, High Power X-rays

Accelerators are machines that use electrical energy to generate free electrons, accelerate them to high speeds (thereby endowing them with high kinetic energies) and direct them at materials typically transported through the radiation beam on some means of conveyance. To generate X-rays, an electron beam can be directed to a target, such as a water-cooled tantalum plate, that causes the electrons to emit X-rays.

Accelerators are similar to cathode ray tubes, as used in older television sets or medical X-ray machines, in the way they generate electrons. These devices produce a cloud of free electrons by heating a negative cathode inside a vacuum chamber. Once generated, the negatively charged electrons are repelled by the negative electrical potential on the cathode and are attracted by the grounded anode plate.

In a direct accelerator, like the RDI Dynamitron®, the negative voltage applied to the cathode determines the total kinetic energy of the electrons. In a microwave linear accelerator (linac), or a radio frequency (RF) accelerator such as an IBA Rhodotron®, the electrons are accelerated to a relatively low energy (typically 25 to 50 keV) and then injected into an electron accelerating structure and accelerated to higher kinetic energies with alternating electric fields. The accelerated electrons escape through a thin metallic window that is mounted in the grounded anode plate and proceed through the air towards the material to be treated.

Accelerator output is usually specified in watts or kilowatts of power. Other factors being equal, a 200 kW accelerator processes four times as much material as a 50 kW accelerator per unit time. Thus, low power accelerators are very restricted in application because low power means low throughput.

The electron beams employed to generate X-rays in the invention typically have energies from 1 MeV to 10 MeV, preferably from 3 MeV to 10 MeV, and ideally from 5 MeV to 7 MeV. The electron beams employed to make X-rays in the invention typically have powers of at least 30 kW, preferably at least 80 kW, ideally at least 100 kW, and, more preferably still, 200 kW or higher.

More suitable electron accelerators have been recently introduced by IBA. The Rhodotron® TT 200 generates up to 100 kW at 10 MeV (10 mA of beam current) and up to 100 kW at 5 MeV (20 mA of beam current). The Rhodotron® TT 300 generates up to 200 kW at 10 MeV (20 mA) and up to 135 kW at 5 MeV (27 mA). The beam powers for the Rhodotron® TT 200 and TT 300 are guaranteed to 80 kW and 150 kW, respectively, for continuous industrial service. IBA has built, and recently tested, the world's first very high power industrial accelerator, the Rhodotron® TT 1000, rated at 7 MeV and 700 kW. The basic concepts of Rhodotron® accelerators are described in U.S. Pat. No. 5,107,221, the entirety of which is incorporated herein by reference.

FIG. 1 compares the penetration of X-rays and an electron beam in water. As shown therein, the electron beam only penetrates 5 cm (area density of 5 $g/cm^2$ in water) at even the highest energy used in commercial practice, 10 MeV. In contrast, X-rays exhibit far greater penetration. Heretofore, X-ray processing has been deemed to have relatively low product throughput. However, with high energy, high power accelerators, product throughput in the X-ray mode, comparable to those attainable with high energy, 10 MeV electrons, can be achieved. The following table illustrates the penetration and throughput of conventional electron beam and X-ray processes, using a 10 MeV 20 kW linac, in comparison to the penetration and throughput capability of X-rays using high energy, high power accelerators. The composite thicknesses are optimum values for treatment from opposite sides, assuming a volume density of 1.5 $g/cm^3$.

| Comparison of Irradiation Sources for Radiation Curing of Composites | | | |
|---|---|---|---|
| Irradiation Source | Composite Thickness | Emitted Beam Power | Throughput at 30% total process efficiency and 100 kGy minimum dose |
| 10 MeV Linac 20 kW, e-beam mode | 5.8 cm | 20 kW | 216 kg/h |
| 10 MeV Linac 20 kW, X-ray mode | 29 cm | 3.2 kW | 34.6 kg/h |
| 7 MeV Rhodotron 200 kW, X-ray mode | 25 cm | 24 kW | 259 kg/h |
| 5 MeV Dynamitron 300 kW, X-ray mode | 23 cm | 24 kW | 259 kg/h |
| 7 MeV Rhodotron 700 kW, X-ray mode | 25 cm | 84 kW | 907 kg/h |

As seen, in the X-ray mode derived from a conventional 20 kW electron beam accelerator, the throughput falls far short as compared to the electron beam mode. However, X-rays produced using high energy, high power accelerators have better throughput, depending on the electron beam power, while attaining far greater penetration.

X-ray Curing of Polymers Generally

The recent development of high power, high energy electron beams makes X-ray curing of polymer composites a viable industrial process. The multifold increase in accelerator power compensates for the conversion rate of electrons to X-rays.

As far as is known, electron beam curable materials are also X-ray curable. While some physical aspects of the processes may differ, the reaction chemistry is basically the same.

Thus, X-ray curable polymers and polymer forming materials are well known in the art and are commercially available. Typically, these polymer forming materials can consist of one or more monomers, oligomers, pre-polymers unsaturated or saturated materials. Often, the unsaturation is in the form of an acrylate and/or methacrylate vinyl functionality.

In one type of X-ray curable material, the reaction proceeds via a free-radical mechanism. Free radicals are highly reactive molecules that contain unpaired electrons on atoms in the molecule. Free radicals are produced directly by exposure of reactants to X-rays or indirectly via the X-ray induced decomposition of an initiator molecule that generates free radicals. Such initiators are required when using ultraviolet radiation, which does not have enough photon energy to cause ionization. Free radicals activate double bonds, such as the functional vinyl groups found in acrylate monomers and oligomers; thereby generating a chain reaction that causes polymerization and/or crosslinking, that is curing.

A second type of X-ray curable material relies upon a cationic mechanism. This process uses salts of complex organic molecules to initiate cationic chain polymerization and crosslinking in materials and monomers containing epoxides. With both electron beam and X-ray curing, specific initiators must be used with such epoxide materials. In contrast, the free radical processes, whether initiated by an electron beams or by X-rays, proceeds without the use of initiators.

Chemical structures can be chemically modified to become X-ray beam curable. For example, epoxides, esters, urethanes, ethers, and other materials can be so modified by introducing acrylate functionality. Typically such functionality is imparted by reacting acrylic acid with alcohol groups or by reacting hydroxyethyl acrylate with acid groups. The general physical and chemical characteristics of the materials, be they urethane, epoxy or ester type, are retained after such acrylate modification.

It is preferred to use X-ray curable materials that are predominantly reactive, that is based on monomers and oligomers, thereby eliminating the need for non-reactive solvents. Radiation curable materials may also contain an initiator, pigments, dyes and other additives. In thermal curing systems, the use of reactive monomers as diluents poses problems in that these monomeric materials can volatilize at high temperatures and become air pollutants. The ability to achieve a cure with near-zero volatile organic compounds (VOCs) depends upon the formulation with radiation curable materials, which are well known for this attribute.

The X-ray curing process takes place almost instantaneously when radiation is applied using the high power, high intensity electron beams described herein. X-ray curing is not affected by the matrix or material color or opacity.

Three examples of the resultant effectiveness of X-ray curing are demonstrated herein. However, the invention is not limited to these envisionments. Those skilled in the art will see that numerous product applications can now be effectively processed using X-rays.

X-ray Curing of Molded Composite Materials

Curing composite parts in a mold is a traditional process used in order to obtain formed items. For thermally cured composites, the mold and tooling must be heated and elevated in temperature in order to obtain cure. This requires the careful placement of heating elements within the mold, design considerations of heat transfer and concerns over cooling articles in order to remove them from the mold. As a result, such molds are rather complex and expensive. The use of electron beam curing requires that at least one mold surface be of a thin gauge or film so as to permit sufficient electron penetration.

However, X-rays can penetrate the mold regardless of whether the mold is made of a metal, such as aluminum or steel, or of an inexpensive formed and cured plastic, such as a fiber reinforced cured polyester. X-rays penetrate the mold with minimal heat build-up and yet affect the desired polymerization and crosslinking of the matrix binder. The mold can have a complex shape without significantly affecting the dose distribution of the uncured matrix material within the mold. With X-ray curing, molds may be utilized in the processes at atmospheric and higher pressures.

Thus, in one embodiment, there is a method of curing a polymer composite material comprising the following steps: (i) placing an X-ray curable monomeric, oligomeric, or polymeric material in a mold; and (ii) exposing the mold, one or more times, to the X-ray beam generated by the bremsstrahlung effect, using an electron beam having an energy ranging from 1 MeV to 10 MeV and a power of at least 30 kW. Preferably, the electron beam has an energy of ranging from 3 to 10 MeV and, more preferably, from 5 to 7 MeV. Preferably, the electron beam has a power of at least 80 kW, more preferably at least 100 kW, and ideally at least 200 kW.

X-ray curable materials that can be used in this molding process include commonly available free-radical curing acrylated oligomers and monomers, such as acrylated epoxies, as well as cationic cured epoxies containing an initiator, such as an iodonium salt. The X-ray curable material may contain reinforcement agents such as organic and inorganic fibers and/or fillers.

Concerns over possible oxygen inhibition involving some free radical systems are overcome in that the mold itself prevents the curable material from being in contact with air during the irradiation process. Thus, chemical reactions that are inhibited by oxygen, ozone or moisture can proceed without retardation. Specifically, the fast curing acrylated materials that are often oxygen inhibited in their cure rates can be used.

The mold may be treated from a single side if the x-ray energy is sufficient to cure the material in this manner, or it may be processed from opposite or various sides, thus providing more uniform energy distribution within the material to be cured. In the case of very complex shapes, it is envisioned that the mold may be rotated during the curing process at a constant or variable rate within the X-ray field in order to produce improved dose uniformity within the article.

X-ray Curing of Impregnated Wood

Wood items can be impregnated with monomers that are then cured within the wood to enhance the properties of the wood, such as surface hardness, dimensional stability and resistance to weathering. An innovative, proprietary wood polymer penetrant (WPP) has been developed by the State University of New York, College of Environmental Science and Forestry (SUNY-ESF), that has been successfully cured using electron beam processing. This material penetrates the cell walls of the wood, in contrast to prior work wherein curable monomeric materials merely filled the lumens in the wood. As a consequence, these penetrant systems provide outstanding dimensional stability to wood during thermal and humidity cycling, with dimensional changes recorded at <0.5 percent. However, in using such electron beam treatment, the depth of cure is limited due to the known limitations on electron energy penetration.

In contrast, the same wood penetrant may be cured with X-rays. This enables the radiation curing of much thicker pieces of impregnated wood. Impregnated wood blocks having a thickness of 17 cm have been successfully cured using X-ray exposure on only on only one side.

Accordingly, in another embodiment, there is a method of curing a wood-polymer composite comprising the following steps: (i) impregnating wood with an X-ray curable monomeric, oligomeric or polymeric material; and (ii) exposing the impregnated wood, one or more times, to X-ray photons generated by the bremsstrahlung effect from an electron beam that has an energy of 1 MeV to 10 MeV and a power of at least 30 kW. Preferably, the electron beam has an energy of 3 to 10 MeV and, more preferably, of 5 to 7 MeV. Preferably, the electron beam has a power of at least 80 kW, more preferably at least 100 kW, and ideally at least 200 kW.

The type of wood that may be employed is not particularly limited, since wood has a general internal structure of lumens surrounded by cell walls which permit the migration of fluids, such as water, through the wood while the wood itself is growing. Suitable woods include, but are not limited to, typical hard and soft woods such as maple, oak, cedar, mahogany and pine.

X-ray Curing of Adhesive Joined Materials

Another application in which X-ray processing provides a unique solution is in the curing of thick laminated structures. Notably when joining materials which have different coefficients of thermal expansion and different thermal conductivities, such as metals, and other inorganic compositions, such as ceramics, interfacial stresses develop when heat is used to cure a joining adhesive. Such interfacial stresses diminish the durability of the bonded structure. For example, when considering the bonding of heat-resistant ceramic tiles, such as those used as the thermal protection layer on space vehicles, to metallic structures, thermal bonding processes are inherently restrictive due to the poor thermal conductivity of ceramics. Similarly, in electron beam processing, electron penetration is limited and may not provide adequate cure through thick layers of materials.

Using X-ray processing, complex structures composed of either similar or dissimilar materials can be made through adhesive bonding, without concern for product orientation toward an energy source and without the generation of excessive heat, which can result in interfacial thermally induced stresses in dissimilar materials. X-ray irradiation can be successfully applied to materials having low thermal conductivity, such as ceramic tiles. X-ray cured adhesives, for example, have been shown to successfully adhere ceramics to aluminum, even though there is an order of magnitude difference in coefficient of thermal expansion for these two materials as well as differences in thermal conductivity. Commercially available photon-activated adhesives, which use either free radical or cationic cure mechanisms, have been X-ray cured without significant heat build up. In using ceramics, care must be exercised to avoid notch or edge imperfections that could result in fracture of the ceramic itself during testing.

Therefore, in still another aspect of the invention, there is a method for bonding similar or dissimilar materials comprising the following steps: (i) spreading an X-ray curable monomeric, oligomeric, or polymeric adhesive on at least one surface of at least one material; (ii) contacting the adhesive treated surface to the surface of another material; and (iii) exposing the materials and adhesive, one or more times, to X-ray photons generated by the bremsstrahlung effect from an electron beam having an energy ranging from 1 MeV to 10 MeV and a power of at least 30 kW. Preferably, the electron beam has an energy ranging from 3 to 10 MeV and, more preferably, from 5 to 7 MeV. Preferably, the electron beam has a power of at least 80 kW, more preferably at least 100 kW, and ideally at least 200 kW Other Applications Other applications, such as the curing of any thick or very complicated shaped part can benefit from X-ray penetration and its ability to initiate controlled curing reactions. Whereas Aerospatiale (now part of the EADS group) utilized X-ray curing for thick portions of filament wound rocket motor housings, process throughput considerations dictated the use of electron beam curing for most of the housing. The lack of sufficient beam power in the Aerospatiale facility thwarted their development of other commercial applications. Other types of composites and materials, such as polymer concrete, can benefit from the increased penetration of X-rays, which can be used to cure materials of such high density.

Irradiation Facility Layouts

Another aspect of the invention is a facility that performs any one of the methods described above. Therefore, the invention includes an irradiation facility that includes the following components: (i) polymer based systems, such as any of those described above; (ii) a means for conveying such systems through an X-ray field generated by the bremsstrahlung effect; and (iii) a metal target for converting electron beams to X-rays; and (iv) one or more accelerators capable of generating an electron beam having an energy ranging from 1 MeV to 10 MeV and a power of at least 1 kW.

The high power, high energy electron beam accelerator and metal target can be deployed in numerous arrangements. In one embodiment, one or more high power accelerators with a horizontal or vertical beam scan horn is fitted with X-ray conversion targets, directing the X-rays into a vault, essentially filling the entire vault with an X-ray field.

One method of insuring that the radiation is contained within the vault involves passing the objects through a "maze" prior to entering the vault. This vault and maze are designed to create four or five scatterings from interior surfaces to reduce the level of radiation at the entrance or exit of the maze down to background radiation levels. Computer codes are commercially available that can accurately model radiation levels outside the vault and maze for any particular facility design.

The maze may be horizontal, vertical, or a combination of both. The objects can continuously travel through the maze and vault in one orientation, or can turn as they pass through the maze. Many other concepts are possible. These are only three examples of possible configurations. The concrete walls are thicker near the electron scanning and X-ray target units and thinner closer to the maze entrance-exit. Using a denser shielding material, such as steel or lead instead of concrete would reduce the required wall thickness and thus the size of the facility.

Radiation attempting to leak from the vault travels in a straight line, but it can scatter from internal surfaces. Shielding designs assume the conservative estimate that four or more scatterings could be needed to meet safety requirements. The use of a maze may be avoided by the use of a thick movable door as was done in the Aerospatiale facility.

Any known means of conveyance can be employed to move the objects through the maze and into the irradiation zone. A mix of overhead and inverted power and free conveyors and chain conveyors is typical. Suitable conveyor systems are commercially available from companies such as Jervis Webb. The principle requirement of the means of conveyance is that it is sufficient to move and support the object throughout the maze and is able to control the speed and angle of the object through the beam to insure sufficiently uniform dosing. The applied dose is inversely proportional to the speed of the material conveyance through the beam.

Figure 2:
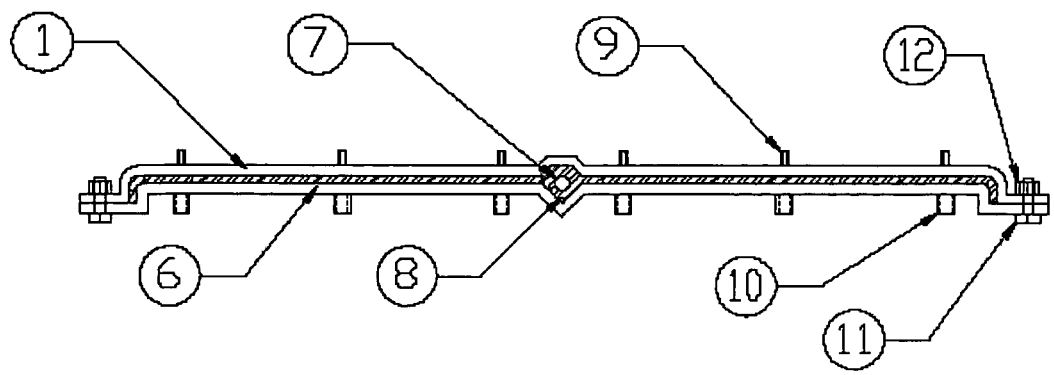
FIG. 2 illustrates a molding material in a mold.
Figure 3:
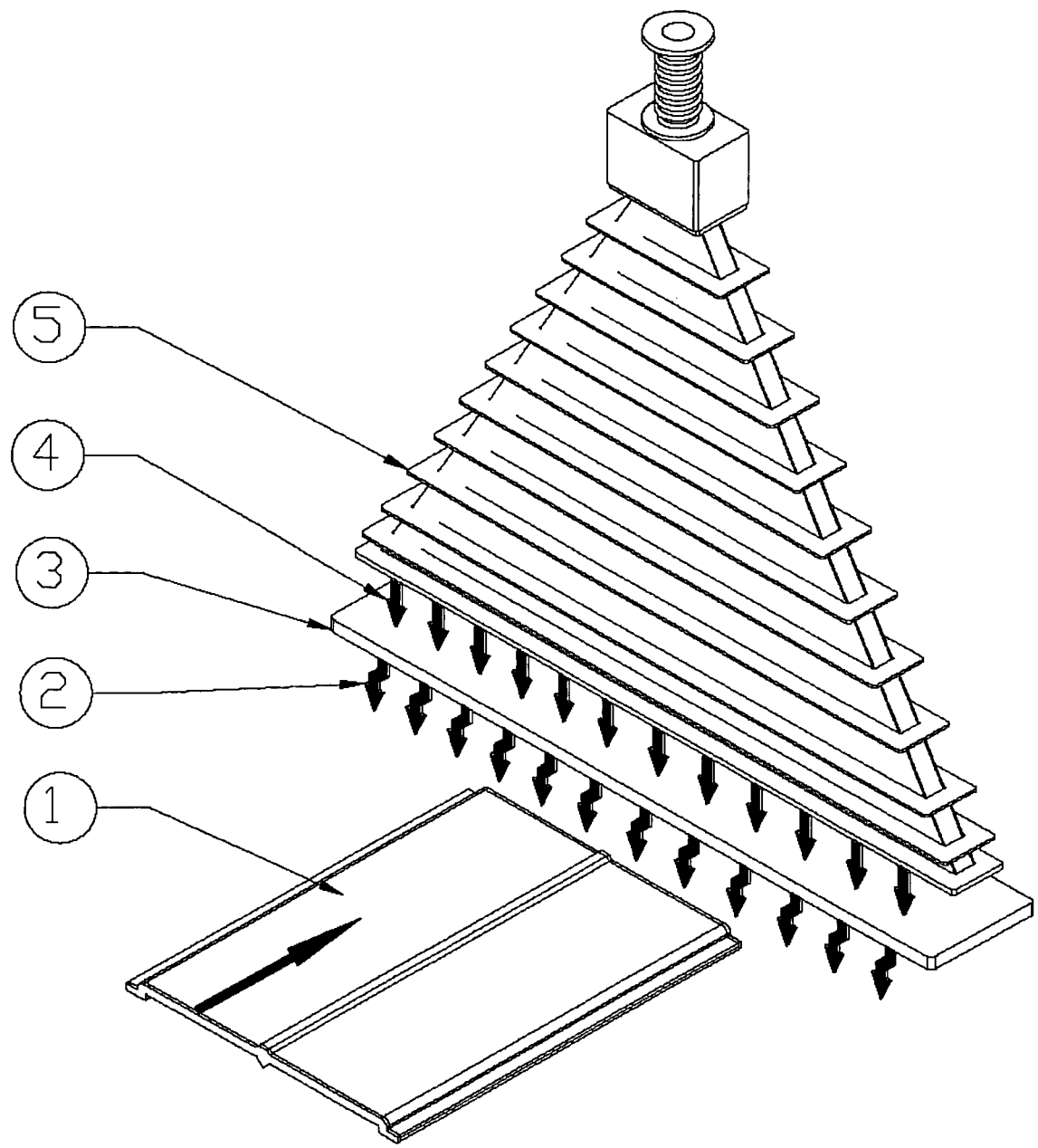
FIG. 3 shows the transportation of the mold in FIG. 2 through an X-ray beam, where the molding material is cured to form a molded part.

An illustration of the X-ray radiation process is shown in FIGS. 2 and 3. FIG. 2 shows a thick two-part mold, consisting of the upper portion 1 and the lower portion 6, containing a composite material 8 consisting of carbon fiber reinforcements and an X-ray curable liquid matrix binder. A structural member 7 with a hollow core is shown within the composite material 8. The mold 1 and 6 contains a mold vent 9, fill tubes 10, bolts 11 and nuts 12 to hold the two halves of the mold 1 and 6 together. FIG. 3 shows the movement (indicated by arrow) of mold 1 and 6 under the X-ray field 2 originating from an X-ray target 3. The X-rays are emitted from the target 3 when the opposite side of the target 3 is exposed to an electron beam 4 from an electron beam scanner 5.

Benefits of the Invention

A common drawback for both thermal and electron beam curing is the limitation posed by the thickness of parts that are to be cured. In thermal curing, heat transfer diminishes as the thickness of the article increases. In electron beam curing, the penetration of the electrons in a composite or shaped article is limited by the beam accelerating voltage. These drawbacks can be avoided by the use of X-rays, which have about 5 to 10 times the penetration of electrons. The conversion of an electron beam into X-rays has been well characterized. From 8% to 16% of the electron beam power is converted to X-rays for industrial processing, with the conversion efficiency depending on the beam energy. With the commercial availability of high power electron accelerators, X-ray processing rates can be comparable to or greater than that which can be obtained when using conventional 20 kW electron beam linear accelerators (linacs).

Besides the well-known advantages of deeper penetration associated with X-rays, it has been shown that this ionizing source provides several advantages in terms of design flexibility and reduction of overall process cost. It has been shown that the dose requirement of some radiation curable materials may be sufficiently low in the X-ray mode to compensate for power losses in converting electron beams to X-rays. The ability to fully cure objects with X-rays eliminates the need for additional time-consuming steps, such as post-radiation cure thermal heating.

The ability to cure in molds also leads to important advantages in terms of attaining surface finish in that the cured material will mirror the surface of the mold. In using liquid radiation curable materials, reinforcing materials, such as fibers can be better wet and thereby enhance matrix to fiber adhesion. X-ray curing permits the use of low cost, well known free-radical chemistry based on materials available from numerous commercial sources. Finally, it has been shown that X-ray curing of complex laminates enables the design of composite structures that were not achievable otherwise or which would have had to be assembled in complex step-wise operations and processes.

EXAMPLES

Aspects of the present teachings can be further understood in light of the following examples, which should not be construed as limiting the scope of the present teachings in any way.

Example 1

X-Ray Curing of Wood Polymer Composites

Using facilities at the State University of New York College of Environmental Science and Forestry (SUNY-ESF), a reactant formulation of vinyl monomers found to penetrate the cell walls of wood were impregnated into wood using a well known vacuum assisted impregnation process.

Preliminary tests performed on 1 cm thick pieces of impregnated maple at the NEO Beam facility (a joint venture between Mercury Plastics Corp. and Kent State University) using a 5 MeV Dynamitron, suggested that with high dose-rate electron beam processing, a dose of 150 kGys or more was required to polymerize the impregnate within the wood. The concomitant heat generated also raised concerns about monomer volatility such that multiple underbeam passes had to be used to limit the temperature rise.

To demonstrate the viability of X-ray processing, 17 cm thick blocks of wood were impregnated with the same penetrant. With low dose-rate X-rays (~2 kGy per minute) generated with the 3 MeV Dynamitron at RDI, the penetrant in the 17 cm block of wood was fully cured throughout the wood with a surface dose of as little as 25 kGy. The upper surface temperature of the wood reached 120° C. at the end of the 25 kGy X-ray exposure. The temperature rise from the irradiation of water or a water-like material (wood) with a dose of 25 kGy would have only reached about 6° C. due to the absorbed dose. This difference in temperature rise is attributed to the exotherm from the polymerization of the penetrant itself. Weight measurements performed before and after X-ray irradiation showed that less than 0.5% of the penetrant or moisture in the wood was lost during X-ray processing. The through-cure of the penetrant within the wood could be observed after the block was cut in half. There was an even distribution of cured polymer penetrant within the wood, showing that the X-ray curing process is indeed viable with such thick articles.

X-ray processing at a lower dose using two-sided exposure at 5 kGy per side (average dose of 6 kGy throughout the sample) indicated that even very low doses could be effective. This is a significant difference from the 100 kGy or more dose required with electron beam processing using the same wood polymer penetrant. The lower dose-rate and longer exposure time with X-rays permits the propagation step of the polymerization of this particular free-radical curing material to proceed without concurrent termination.

This difference in the dose required in electron beam and X-ray processing may be explained by the inherent difference of short-term dose rates between these radiation sources. The low efficiency for generating X-rays reduces the emitted power by about 10 fold. The greater penetration of X-rays reduces the dose rate by about 5 to 10 fold. The greater angular dispersion of the X-ray beam increases its area and further reduces the short-term dose rate by at least 10 fold. So, the dose rate with electron beam radiation may be more than 500 to 1000 times higher than with X-ray radiation using the same electron beam on the X-ray target. Polymerization with ionizing radiation is a chain reaction that can terminate when the growing polymer finds another ion or free radical. Therefore, high dose rates may reduce the effectiveness of ionizing radiation for some polymerization reactions.

Example 2

X-ray Curing of Adhesives

Five commercially available, photon-activated adhesives obtained from the Dymax Corporation (Torrington, Conn.) and from the Loctite division of the Henkel Corporation (Rocky Hill, Conn.) were found to bond aluminum-to-ceramic. Aluminum and ceramics differ by one order of magnitude in their coefficients of thermal expansion and, in addition, these materials differ significantly in thermal conductivity, with ceramic being a poor conductor of heat and aluminum known for its high thermal conductivity. The ceramic samples used were 3.6 g/cc alumina obtained from Superior Technical Ceramics Corporation. Thin (3 mm) aluminum samples cut to a standard 2.5 cm width were used to allow for both electron beam curing and X-ray curing of the adhesives in order to compare these two radiation processes. These were adhered to ceramic pieces also cut to 2.5 cm width.

Adhesive bonded specimens suitable for testing in tension, per ASTM International method D-1002 Standard Test Method for Apparent Shear Strength of Single-Lap-Joint Adhesively Bonded Metal Specimens by Tension Loading (Metal-to-Metal), using a 0.127 cm/minute strain rate, were prepared with the five adhesive samples and irradiated to 40 kGy with X-ray and electron beams. During a first series of tests, all 2.5 cm (1 inch) wide ceramic substrates fractured, leaving the bonded area intact. Imperfections in the cutting of the ceramic to such narrow widths were deemed to contribute to the fracture of the ceramic before adhesive bond failure. For a second series of tests, wider ceramic samples were bonded to 2.5 cm wide aluminum pieces with replicates of the same adhesive bonded to the same piece of wider ceramic. Measurable test results could thus be attained. One of these commercially available adhesives designed for radiation curing exhibited a high value of 11.4 MPa lap shear strength when cured using X-rays.

Example 3

X-ray Curing of Molded Composites

Simulated molds were made using standard twelve-cup steel baking trays with a 7 cm diameter top, a 5 cm diameter base and 3.4 cm depth per cup. Samples of carbon fiber twill (140 g/m$^2$ and 280μ thick obtained from Applied Vehicle Technology—Indianapolis, Ind.) were soaked with a formulation based upon an acrylate modified epoxy oligomer, provided by Strahmore Products (Syracuse, N.Y.). These fiber-matrix systems were then inserted and squeezed between two identical cups and then X-ray cured in the steel baking tray mold with a 2 cm thick piece of aluminum plate placed above it. The thickness of the aluminum plate is sufficient to preclude penetration from even 10 MeV electrons. Such simulated molds were used in lieu of cutting aluminum metal molds themselves for these initial experiments. The fitting of the upper and lower cups eliminated air from the simulated mold. The viscosity of the formulated matrix material was such as to permit flow and wetting of the fibers when compressed within the cupped structure. These were then X-ray cured using a 3 MeV, 90 kW electron beam with a tantalum target mounted in front of its scan horn. Full cure of the shaped objects was achieved with a surface dose of only 20 kGy.

Example 4

X-ray Curing of Molded Composites

To form plastic molds, two thick plastic plates (38 cm×22.5 cm×1 cm), made from high density polyethylene (HDPE) and from polycarbonate (PC), or from polymethyl methacrylate (PMMA), were bolted together with nylon nuts and bolts. A molding space was formed by placing plastic shim stock between them the plates. The shim stock forming the mold also had holes bored along its perimeter so that it could be bolted between the plastic plates. A rectangular area 25 cm×11 cm was cut out in the middle of the shim. The thickness of the shim stock, typically 2 mm, was used to control the thickness of the flat molded material. Injection and exit ports were drilled through one of the plastic plates of each material in opposite corners so that the interior of the mold area could be placed under vacuum and liquid matrix materials could be injected from the diagonally opposite end. The internal shim was cut out in diagonal corners to match the ports in the upper plate. The lower plate was left solid except for the holes need to bolt it through the shim to the upper plate.

Silicone sealant was placed around the upper and lower perimeter of the shim plate. Eight plies of appropriately cut carbon fiber twill were laid within the shim stock opening and the assembly using the HDPE plates was then bolted together. The silicone sealant served to gasket the interior area. With one portal closed, a vacuum was pulled on the interior down to 220 mm. While under vacuum, a proprietary formulation, based on an acrylated epoxy (Strathmore Products 91-111-4), was injected into the mold through the portal opposite the vacuum end. This simulated the industrial process of vacuum assisted resin transfer molding (VARTM) as known in the composites industry.

The sealed assembly was then placed beneath the X-ray target in RDI's test facility and irradiated to 20 kGy. The cured eight ply carbon fiber composite easily released from the HDPE mold leaving an excellent surface finish.

Example 5

X-ray Curing of Molded Composites

In order to see the injection of the radiation curable material into the carbon fiber twill, mold assemblies as described in Example 4 were made using one plate of the clear and transparent PC and PMMA and the other of the opaque HDPE. As in Example 4, silicone sealant was placed around the perimeter of the shim stock opening and eight plies of carbon fiber twill laid within the interior. Two lower viscosity formulations (Strathmore Products 3-114-1 at ~550 centipoises and 3-114-2 at ~175 cps) based upon acrylated epoxy oligomers were evaluated. The lower viscosities of these materials enabled them to be injected into the carbon fiber twill without vacuum assistance. Both materials wet the carbon fibers and filled the molds without significant injection pressure. The vacuum portals merely served to release entrapped air from the interior of the molds.

As in Example 4, these composite materials were X-ray cured within the molds at a dose of 20 kGy. Both materials were fully cured and could be released from the mold. Excellent surface finishes were attained.

Example 6

X-ray Curing of a Molded Product

A small, inexpensive commercial mold was used to produce a walking cane handle. This mold was made from cured fiber reinforced polyester with 9 mm wall thickness. Silicone sealant was placed around the perimeter of the mold interior shape. The mold was closed using nylon screws and wing nuts. The radiation curable material used in Example 5, Strathmore Products 3-114-1, was injected into a port on one edge of the mold and allow air to escape through a similar port on the same edge. The filled mold was then placed beneath the X-ray target at the RDI facility and cured to a dose of 20 kGy. A solid cured plastic walking cane handle was produced which was 3 cm thick and 17 cm in length having the defined shape of the mold.

Incorporation by Reference

All publications, patents and patent applications mentioned in this specification are herein incorporated by reference to the same extent as if each individual publication, patent or patent application was specifically and individually indicated to be incorporated by reference. No admission is made that any reference cited herein is prior art.

Spirit and Scope of the Invention

The invention now having been described, it will be apparent to those of ordinary skill in the art that many changes and modifications are possible without departing from the spirit of the invention. Accordingly, the scope of the invention is solely limited by the following claims and equivalents thereto as determined by law.

The invention claimed is:

1. A method of curing a polymer forming material comprising the following steps: (i) placing an X-ray curable monomer, oligomer, pre-polymer, unsaturated or saturated material, or mixture thereof, within the interior of a mold; and (ii) exposing the exterior of the mold, one or more times, to X-ray photons generated by the bremsstrahlung effect, using an electron beam having an energy ranging from 1 MeV to 10 MeV and a beam power of at least 1 kW, wherein the X-ray photons penetrate the mold to fully cure the X-ray curable monomer, oligomer, pre-polymer, unsaturated or saturated material, or mixture thereof within the interior of the mold.

2. A method of curing a polymer forming composite material comprising the following steps: (i) placing an X-ray curable monomer, oligomer, pre-polymer unsaturated or saturated material, or mixtures thereof, and one or more reinforcement agents within the interior of a mold; and (ii) exposing the mold, one or more times, to X-ray photons generated by the bremsstrahlung effect, using an electron beam having an energy ranging from 1 MeV to 10 MeV and a beam power of at least 1 kW wherein the X-ray photons penetrate the mold to fully cure the X-ray curable monomer, oligomer, pre-polymer, unsaturated or saturated material, or mixture thereof within the interior of the mold.

3. A method of claim 1 or 2 where said mold is made of a metallic material.

4. A method of claim 1 or 2 where said mold is made of a plastic material.

5. A method of claim 1 or 2 where said mold is made of a ceramic material.

6. The method of claim 1 or 2 wherein the X-ray curable materials are reactive and the X-ray curing of said materials results in the production of near-zero volatile organic compounds (VOCs).

7. The method of claim 1 or 2 wherein the X-ray curable materials are selected from the group consisting of monomers, oligomers, pre-polymers, unsaturated or saturated materials.

8. The method of claim 1 or 2 where the electron beam has an energy ranging from 1 to 10 MeV.

9. The method of claim 1 or 2 where the electron beam has an energy ranging from 3 to 10 MeV.

10. The method of claim 1 or 2 where the electron beam has an energy ranging from 5 to 7 MeV.

11. The method of claim 1 or 2 where the electron beam has a power of at least 1 kW.

12. The method of claim 1 or 2 where the electron beam has a power of at least 30 kW.

13. The method of claim 1 or 2 where the electron beam has a power of at least 80 kW.

14. The method of claim 1 or 2 where the electron beam has a power of at least 100 kW.

15. The method of claim 1 or 2 where the electron beam has a power of at least 200 kW.

16. The method of claim 1 or 2 further comprising the step of rotating the mold during the step of exposing the mold to X-ray photons.

17. The method of claim 1 or 2 wherein the X-ray curable material comprises unsaturated material wherein the unsaturation is in the form of an acrylate and/or methacrylate vinyl functionality.

18. A method of curing a polymer forming material comprising the following steps: (i) placing a polymer forming material within the interior of a mold; and (ii) exposing the exterior of the mold, one or more times, to X-ray photons generated by the bremsstrahlung effect, using an electron beam having an energy ranging from 1 MeV to 10 MeV and a beam power of at least 1 kW, wherein the X-ray photons penetrate the mold to fully cure the polymer forming material within the interior of the mold.

19. The method of claim 18 wherein the polymer forming material consists of X-ray curable monomer, oligomer, pre-polymer, unsaturated or saturated material, or a mixture thereof.

* * * * *